Figure 1:
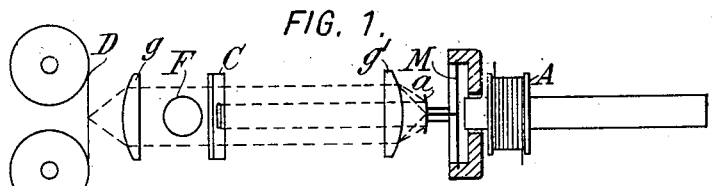

No. 662,021. Patented Nov. 20, 1900.
A. POLLAK & J. VIRAG.
METHOD OF RAPIDLY TRANSMITTING TELEGRAMS.
(Application filed Dec. 21, 1899.)

(No Model.) 3 Sheets—Sheet 1.

INVENTORS:
Anton Pollak and Josef Virag
By Attorneys,

WITNESSES:

No. 662,021. Patented Nov. 20, 1900.
A. POLLAK & J. VIRAG.
METHOD OF RAPIDLY TRANSMITTING TELEGRAMS.
(Application filed Dec. 21, 1899.)

(No Model.) 3 Sheets—Sheet 2.

WITNESSES:
Fred White
Thomas Wallace

INVENTORS:
Anton Pollak and Josef Virag,
By Attorneys,

No. 662,021. Patented Nov. 20, 1900.
A. POLLAK & J. VIRAG.
METHOD OF RAPIDLY TRANSMITTING TELEGRAMS.
(Application filed Dec. 21, 1899.)
(No Model.) 3 Sheets—Sheet 3.
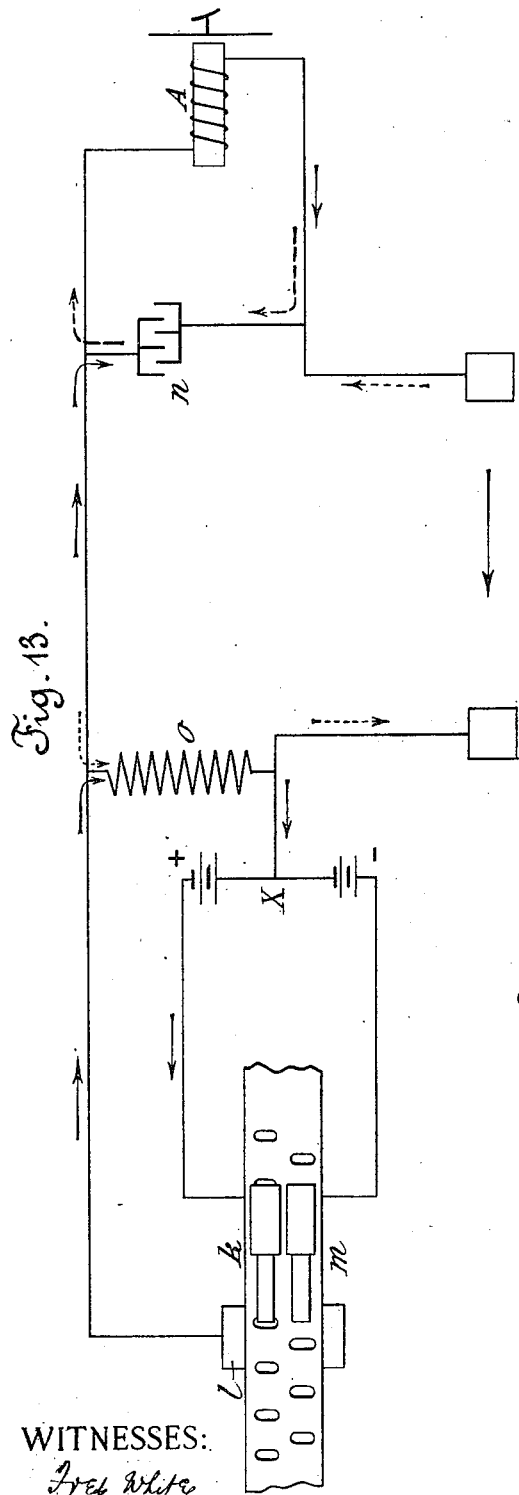
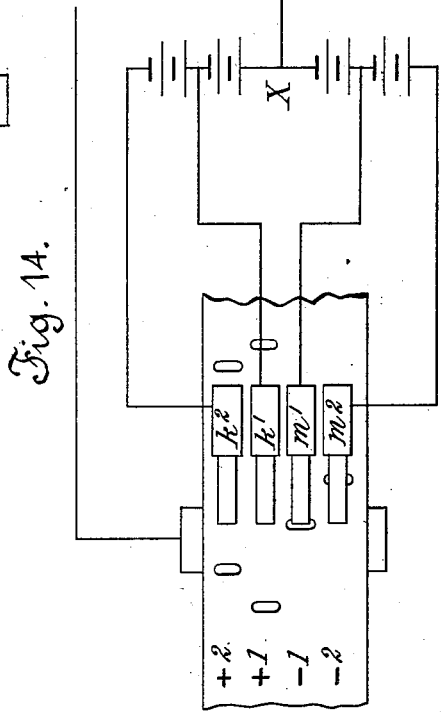
WITNESSES:
INVENTORS:
Anton Pollak and Josef Virag,
By Attorneys,

UNITED STATES PATENT OFFICE.

ANTON POLLAK AND JOSEF VIRAG, OF BUDA-PESTH, AUSTRIA-HUNGARY, ASSIGNOR OF ONE-HALF TO VEREINIGTE ELEKTRICITÄTS ACTIEN-GESELLSCHAFT, OF SAME PLACE, AND FRIEDRICH SILBERSTEIN, OF VIENNA, AUSTRIA-HUNGARY.

METHOD OF RAPIDLY TRANSMITTING TELEGRAMS.

SPECIFICATION forming part of Letters Patent No. 662,021, dated November 20, 1900.

Application filed December 21, 1899. Serial No. 741,115. (No specimens.)

*To all whom it may concern:*

Be it known that we, ANTON POLLAK and JOSEF VIRAG, residing at Buda-Pesth, in the Empire of Austria-Hungary, have invented certain new and useful Improvements in Methods of Rapidly Transmitting Telegrams, of which the following is a specification.

This invention relates to automatic telegraphy, and has for its object a more rapid transmission of telegraphic messages than has been hitherto attained.

Our invention relates to telegraphic systems wherein the transmission is effected by automatic means, as by a prepared strip of paper traveling through a suitable transmitter, whereby electrical impulses are sent over the line to the receiving instrument, which consists of an electromagnetic vibrator having suitable means for recording its vibrations, preferably after the manner of a recording-mirror galvanometer—that is to say, the vibrations of the receiver are communicated to a mirror to oscillate it, and thereby deflect a beam or ray of light, which is received and photographically recorded upon a photosensitive sheet or strip.

According to our invention the pulsations transmitted are of uniform duration, but may differ either in sign or intensity. The vibrator of the receiving instrument vibrates in harmony with these impulses, vibrating in one direction or the other according to their sign and to an extent depending upon their intensity.

It is a characteristic of our invention that the duration of the impulse so nearly coincides with the period of one complete vibration of the vibrator of the receiver as to suppress supplementary vibrations, which would otherwise tend to confuse the record.

Our invention allows the transmission of telegrams with a speed hitherto unknown and may be practiced by means of simple, compact, and inexpensive apparatus.

The special construction of the apparatus hereinafter described is of secondary consideration, the invention residing in the novel method employed for availing of such apparatus for the purpose of telegraphing.

Figure 2:
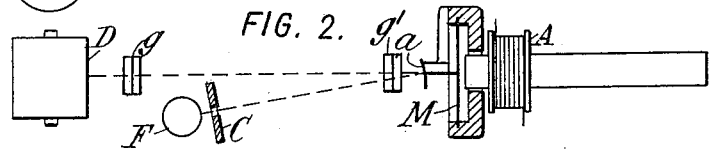
Figure 4:
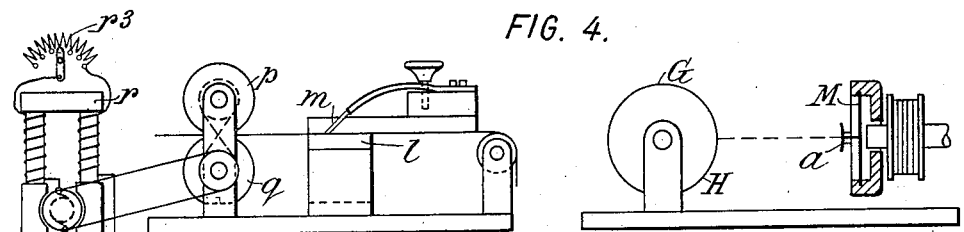
Figure 5:
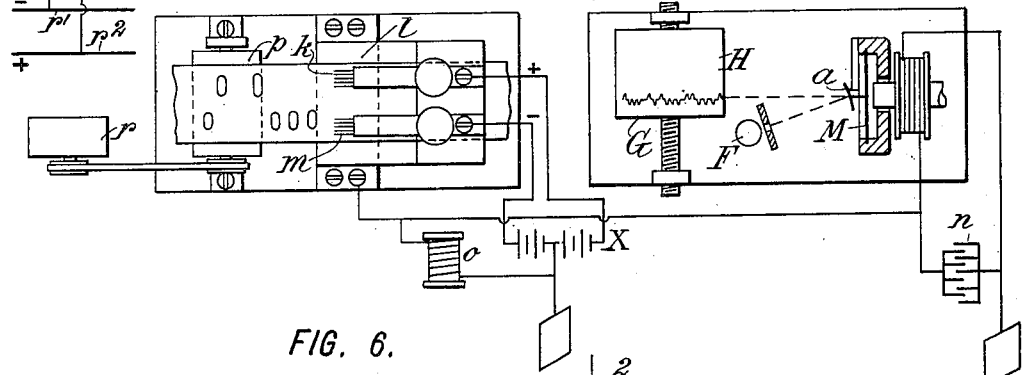
Figure 6:
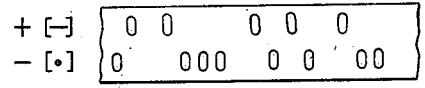
Figure 6:
Figure 7:
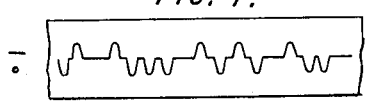
Figure 3:
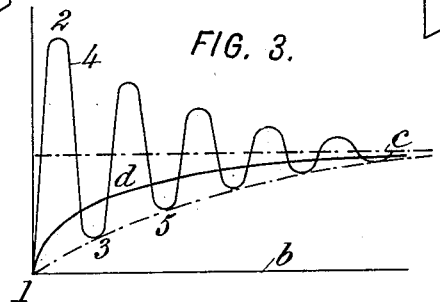
Figure 11:
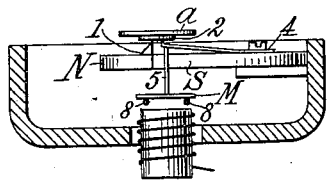
Figure 8:
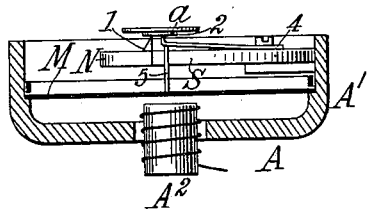
Figure 12:
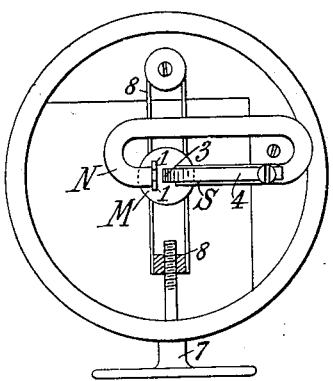
Figure 9:
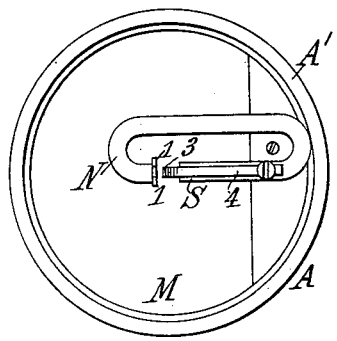
Figure 10:
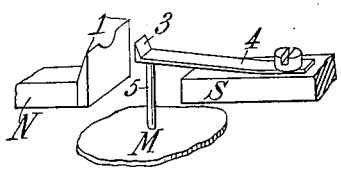

Referring to the drawings which illustrate one convenient form of apparatus for practicing our invention, Figure 1 is a top view of the apparatus for the receiving-station. Fig. 2 is a side elevation thereof. Fig. 3 is a diagram illustrating the variations produced by the vibrating diaphragm. Fig. 4 is a side elevation of the system employed by us in carrying out our invention. Fig. 5 is a top plan view thereof. Fig. 6 is a view of the perforated strip used at the transmission-station, and Fig. 7 is a view of the record obtained at the receiving-station. Figs. 8, 9, and 10 illustrate in detail one form of receiving instrument, of which Fig. 8 is a transverse section, Fig. 9 is a plan with the mirror removed, and Fig. 10 is a fragmentary perspective view. Figs. 11 and 12 show another form of receiving instrument, Fig. 11 being a mid-section and Fig. 12 a sectional plan of the mirror removed. Fig. 13 is a diagram illustrating the circuit arrangements. Fig. 14 is a diagram of a transmitter adapted to transmit impulses differing both in sign and intensity. Fig. 15 is a view corresponding to Fig. 7 and showing the record obtained at the receiving-station upon using the transmitter illustrated in Fig. 14.

Referring to Figs. 4 and 5, we have shown at the left hand of these figures the transmitting apparatus and at the right hand the receiving apparatus which we prefer to employ. The transmitting apparatus here shown consists of a pair of rotating rollers $p\,q$, which are designed to feed a strip of paper perforated according to the message to be transmitted in the well-known manner underneath brushes $k\,m$, whereby a current is led from the battery X, either positive through the brush $k$ or negative through the brush $m$, to the conducting supporting-plate $l$, according as the brush $k$ or the brush $m$ comes in contact with this plate through the perforations of the strip.

A form of perforated paper strip especially suited for our purpose is shown in Fig. 6. As there shown, the perforations are not circular, but oblong, whereby through the insured contact of the brushes the circuit making and breaking take place in a more precise and positive manner. The arrangement of the perforations is such that those serving for producing the positive and negative impulses are respectively arranged in special lines. In Fig. 6 the first four letters of the alphabet are illustrated to correspond to the Morse signs. The openings in the upper line represent the dashes. Those in the lower line represent the dots.

The receiving apparatus shown comprises an electromagnetic vibrator or oscillometer, being preferably a telephone A, having a vibrating diaphragm M, which is connected to a small mirror $a$, so that the vibrations of the diaphragm shall oscillate the mirror. The telephone-coil is or may be in the line-circuit. A ray of light from a source F is projected through an opening in a stationary screen C upon the mirror $a$, which is preferably a concave mirror, by which is reflected a sharp image or point of light on a moving strip or sheet D of photosensitive paper or film. The current impulses coming from the transmitting-station enter into the coil of the telephone A and vibrate its diaphragm.

When a current impulse from the transmitting-station reaches the coil of the telephone, the telephone-diaphragm is moved or vibrates, and the mirror $a$, which is connected therewith, responds to such impulse. The oscillating mirror causes a change in the direction of the reflected ray of light, so that the point of light on the sensitive strip moves to an extent depending on the extent of movement of the diaphragm. In consequence of the rapid oscillations of the telephone-diaphragm and the small weight of the mirror $a$ the oscillations of the latter occur rapidly, and the range of oscillations or vibrations is very considerable even with a weak current.

In Figs. 8, 9, and 10 one suitable construction of the telephone is shown on a larger scale. In these figures the telephone A comprises a shell A', magnet A², and diaphragm M. Fixed to the shell of the telephone is a permanent magnet N S, which, as shown in Fig. 10, is formed at one pole N with sharp edges or points 1. The opposite pole S carries a delicate spring 4, formed at its free end with a sharp edge 3. Between the free end of the spring 4 and diaphragm M is interposed a light rod 5. The mirror $a$ is provided with an iron back and is held on the edges 1 and 3 by magnetic attraction. The movements of the diaphragm are transmitted to the mirror through the rod 5, which moves the spring 4. As the edges 1 and 3 are in close proximity, relatively great movements are given to the mirror by the comparatively small movements of the diaphragm.

To attain the object in view, it is not absolutely necessary to employ the above-described reflector-telephone, as any rapidly-oscillating mirror galvanometer or so-called "oscillometer" may be used. It is not necessary to here describe such oscillometers, as they are well known. Blondell in the *Electrician*, Vol. 30, p. 571, describes the most important types of such apparatus.

We show in Fig. 7 a portion of a record corresponding to the transmitting-strip shown in Fig. 6, this record being that which should be produced by an oscillating ray of light, the movements of which are caused by the telephone or oscillometer herein described. The telephone-diaphragm or oscillometer is not, however, capable of exactly reproducing the current impulses owing to its tendency when moved by a current impulse to continue in vibration according to its own characteristic rate of vibration or pitch. Hence the tendency is that each impulse shall be followed by a series of diminishing oscillations, which would confuse the record and render it unintelligible. Our invention avoids these supplementary oscillations and produces clear and well-defined signs, corresponding closely to the ideal signs shown in Fig. 7, while the current impulses producing them may be sent from the transmitting-station with great rapidity. To make this clear, we will refer to the diagram, Fig. 3, where the sinuous line 1 2 3, &c., represents the vibrations of a diaphragm attracted from its position of rest (indicated at line $b$) by a current of a certain strength, which should deflect the diaphragm to the position indicated by the line $c$. The diaphragm, starting at 1, is attracted toward the line $c$, but swings across this line in one complete semivibration to the point 2, whence it returns in a diminishing oscillation to the point 3, and continues to vibrate with lessening amplitude, following the diminishing oscillations shown until it finally comes to rest on the line $c$. Such is the performance of an unmuffled diaphragm which is free to vibrate in its own natural period. Now if the diaphragm were muffled or damped, so as to retard its vibration, it would move gradually from the initial position $b$ to the position $c$ in the manner indicated graphically by the curved full line $d$. Such a muffled diaphragm would produce signs free from confusing vibrations and approximating closely enough to the true curves shown in Fig. 7; but the rate of transmission would be very slow because of the sluggish response of the diaphragm to the successive impulses. If, however, with an unmuffled diaphragm the current impulse, starting at 1, is cut off at 3, where the diaphragm having executed one complete oscillation has returned nearest to its original position, the aftervibration due to the further movement of the diaphragm from the point 3 to its normal position $b$ is so nearly devoid of energy that in practice it may be entirely neglected, and it does not interfere with the true reproduction of the signs.

Our invention accordingly is distinguished by such proportioning of the duration of the transmitted impulses to the natural period of vibration of the vibrating member of the receiving instrument or oscillometer that the duration of the impulse shall so nearly correspond to one complete oscillation of the receiver as to practically suppress any deleterious aftervibrations thereof. By this simple method alone, whereby for the first time in the art we adapt the rate of transmission to the natural period or typical rate of vibration of the receiver, we increase the speed of transmission at least three times over what would be possible if the vibrating member or diaphragm of the receiver were mechanically damped.

We may carry our invention into practice in two ways, first, by regulating the speed of transmission in order to bring it into harmony with the natural rate of vibration of the receiver, or, second, by adopting a fixed speed of transmission and regulating the rate of vibration of the receiver.

The first method may be variously performed—as, for example, by accelerating or retarding the speed at which the perforated strip is drawn through the transmitting instrument. One way of accomplishing this is shown in Fig. 4, where the electromotor $r$, which drives the rollers $p$ $q$ of the transmitter, is provided with means for regulating its speed. The motor is here shown as fed from main circuit wires or leads $r'$ and $r^2$ under a constant electromotive force, a rheostat $r^3$ being introduced in the branch circuit feeding the motor, whereby the current through this branch circuit energizing the motor may be controlled, this being a common and well-known means for varying the speed of electromotors. The speed of the strip must be controlled proportionally to the size of its perforations, so that the current impulses shall last only so long as is necessary for the telephone-diaphragm or other oscillating member of the receiver to return in consequence of its own vibration to the closest proximity to its position before the current impulse.

The second method may be performed by any means adapted to modify the rate of vibration of the diaphragm or vibrating member of the receiving instrument. To observe this condition, it is necessary that the strip of perforated paper at the transmitting-station should move at a certain constant speed. One means for thus controlling the receiver is shown in Figs. 11 and 12, where the vibrating member is a disk M, which is fixed upon wires 8 8, which are stretched across the shell of the telephone, and the tension upon these wires is adjustable by means of a screw 7. By turning this screw the tension of the wires, and consequently their rate of vibration, is altered, whereby the instrument may be adjusted to vibrate at a rate so proportioned to the duration of the impulses that the diaphragm shall execute one complete oscillation to each impulse.

Both methods of regulation just described involve the necessity of a practically-uniform rate of transmission which in practice would necessitate the employment of precise working motors.

A further feature of our invention facilitates attaining the desired object and enables even a higher speed of transmission to be maintained. According to this feature of our invention we shorten the duration of the impulse to somewhat less than one complete oscillation of the diaphragm or vibrating member of the receiver. This is easily attained by moving the strip at a greater rapidity through the transmitter than has been heretofore described. We also prolong the effect of the impulse upon the receiver by employing a condenser connected in parallel to the receiving instrument, as shown at $n$ in Fig. 5. As a consequence of this arrangement when the circuit is closed part of the current is collected in the condenser, which after the current is interrupted discharges itself through the coil of the receiving instrument or oscillometer. For example, the duration of the impulse may equal two-thirds of the time of a complete oscillation of the receiving instrument, so that in Fig. 3 the impulse may cease at the point 4. During this time it has charged the condenser, the discharge of which through the receiving instrument prolongs the effect of the impulse to approximately the point 3. By employing a condenser of suitable capacity the diaphragm or vibrator of the receiver is caused to return to its original position without any supplemental oscillations. This expedient so sharpens the record as to bring it practically to the form shown in Fig. 7 and permits the adoption of a speed of transmission which is approximately double that attainable by the first-described means.

A further feature of our invention applies to the transmission over long lines. In order to obtain a rapid succession of current impulses over long lines notwithstanding the capacity and self-induction of the line, we have found it to be advantageous to arrange in parallel with the line one or more self-induction coils, an example of which is shown at $o$ in Fig. 5. The effect of such coil is to cause after each current impulse a second impulse in the opposite direction over the line-circuit. By properly proportioning the capacity of this coil to the self-induction, capacity, and resistance of the line we are able to secure a sharp, clear, and legible record over lines of great length.

The circuit arrangements will be more apparent from the diagram Fig. 13, where the solid arrows show the direction of the impulse from the transmitting-battery X. The broken arrows show the discharge from the condenser $n$, and the dotted arrows show the discharge from the self-induction coil $o$.

In the arrangement thus far described only positive and negative current impulses are used in transmitting. Our invention is equally applicable, however, when currents of different strength are used. By using simultaneously current impulses of different directions and strengths the number of signs may be considerably diminished—as, for instance, in such a manner that the weaker positive impulses may represent the dots of the Morse signs and the stronger positive impulses may represent the dashes, while the weaker negative impulses may represent two dots and the stronger negative impulses two dashes, as shown in Fig. 15, which corresponds otherwise to Fig. 7. For this purpose the number of brushes and of openings in the transmitting-strip will be correspondingly chosen. One means for carrying out this feature is shown in Fig. 14, where the line-battery X is so divided as to give positive and negative impulses of different strengths, the weaker positive battery being connected to the positive brush $k'$ and the stronger to the positive brush $k^2$, while the weaker negative battery is connected to the negative brush $m'$ and the stronger to the negative brush $m^2$, the strip of prepared paper having four corresponding rows of holes. In Figs. 14 and 15 the signs $+1 -1$ indicate the weaker positive and negative currents, while $+2$ and $-2$ indicate the stronger positive and negative currents.

The duration of the oscillations of the vibrating receiver will remain constant, irrespective of the intensity of the impulses. Each impulse may, therefore, according to our invention affect the receiver for such a duration that it terminates when the latter has approached its position of rest after a complete oscillation.

That the mirror of the telephone or oscillometer may be as small as possible, and consequently light, and so that a less strong source of light may be employed a diaphragm C with a long narrow slit instead of a circular hole may be used in front of the source of light F, as shown in Fig. 1. The beam of light thus formed is focused to a point by a lens $g$, which has a short focus and is placed as near as possible to the sensitive strip of paper. The mirror may be even smaller if a small cylinder-lens $g'$ of short focus is placed in front of it, the generatrix of which is parallel to the plane of vibration of the ray of light and which is placed at such a distance from the mirror that the image produced by it shows on the top of the said mirror. The ray of light reflected from the mirror passes again through the lens $g'$.

The photographic record may be made upon any suitable strip or sheet caused to travel in any suitable manner in a direction crossing the oscillations of the point of light. Thus the signs constitute a sinuous line, which after the strip has been developed and fixed produces a record exactly indicating the contents of the telegram sent from the transmitting-station. The sensitized paper may be placed around a rotating and forwardly-moving drum H, as shown in Figs. 4 and 5, so that the record extends spirally around it. This arrangement is of advantage for non-continuous working, as during the changing of the strip of sensitive paper after it has been fully used at one station this station may be occupied in sending telegrams to the transmitting-station, or the line may be used for sending to a third station. The apparatus shown may, however, be used for continuous working in any suitable way—as, for example, by coiling a long band D in the manner shown in Fig. 1, or in such manner that the signs are disposed perpendicularly to the direction of travel of the band. In such case the developing and fixing of the sensitized strip may be easily and simply effected by passing it through suitable vessels which contain the required developing and fixing solutions.

It is not essential to our invention that the identical impulses sent from the transmitter shall be the ones which directly affect the receiver, it being within our invention to employ any system found in the telegraphic or telephonic arts whereby electric impulses transmitted from a transmitting-station shall influence or determine impulses which at the receiving-station shall themselves act upon the receiving instrument. It is also to be understood that the duration of the impulses, which is essential to our invention, is that which directly influences the receiving instrument. Thus in the case already explained where a condenser is used the transmitted impulses are shorter than those which would best influence the receiver; but these impulses are prolonged in their effect upon the receiver by the action of the condenser, and such effect terminates or ceases at the appropriate point in the oscillation of the receiver.

While the preferred and most perfect mode of practicing our invention involves that the impulse actuating the receiver shall terminate at the end of one complete oscillation of its vibrator, it is within our invention that such impulse may include a definite multiple of such duration, so as, for example, to discontinue the impulse affecting the receiver at the end of the second complete oscillation of its vibration—that is to say, at the point 5 in Fig. 3—which would modify the system herein described to the extent merely of duplicating each sign. This, although it would necessitate operating at a slower speed of transmission, would nevertheless provide a system having a higher rate of transmission than other systems of telegraphy heretofore known.

What we claim is—

1. The method of rapidly transmitting telegrams which consists in producing a series of current impulses at the transmitting-station, conducting said impulses to the receiving-station, and there causing said impulses to vibrate a reflector reflecting a ray of light, and cutting off each impulse when the reflector in its oscillation has approached nearest to its position of rest.

2. The method of rapidly transmitting telegrams which consists in producing a series of current impulses at the transmitting-station, adapted to affect a vibratory receiver at the receiving-station, and cutting off each impulse at a point such that the receiver shall be influenced thereby during one complete oscillation, so that the effect of the impulse upon the receiver shall cease when its vibration has carried it nearest to its point of rest.

3. The method of rapidly transmitting telegrams which consists in producing a series of current impulses at the transmitting-station adapted to affect a vibratory receiver at the receiving-station, and cutting off each impulse when the receiver in the course of one of its oscillations has approached the nearest point to its position of rest to which it will move during such oscillation.

4. In the transmission of telegrams in which a vibratory receiver is acted upon by current impulses, the method of preventing deleterious aftervibrations of the receiver, which consists in subjecting it to an impulse of a duration such that it terminates when the receiver in the course of one of its oscillations has approached the nearest point to its position of rest.

5. The method of rapidly transmitting telegrams which consists in producing a series of current impulses at the transmitting-station adapted to affect a vibratory receiver at the receiving-station, and so synchronizing the transmitter and receiver that the duration of each impulse affecting the receiver shall correspond to one complete oscillation thereof.

6. The method of rapidly transmitting telegrams which consists in producing a series of current impulses at the transmitting-station adapted to affect a vibratory receiver at the receiving-station, and prolonging the duration of each impulse to such extent as to correspond with the period of vibration of the receiver, so that injurious aftervibrations are avoided and a clear record is produced.

7. The method of rapidly transmitting telegrams which consists in producing a series of current impulses at the transmitting-station adapted to affect a vibratory receiver at the receiving-station, and prolonging the duration of each impulse so that it terminates when the receiver in the course of one of its oscillations has approached the nearest point to its position of rest to which it will move during such oscillation.

8. The method of rapidly transmitting telegrams which consists in producing a series of current impulses at the transmitting-station adapted to affect a vibratory receiver at the receiving-station, so synchronizing the transmitter and receiver that the duration of each impulse affecting the receiver shall correspond to one complete oscillation thereof, and generating by self-induction after each impulse a second impulse over the line in a direction opposite thereto, to the effect set forth.

In witness whereof we have hereunto signed our names in the presence of two subscribing witnesses.

ANTON POLLAK.
JOSEF VIRAG.

Witnesses:
   FRED WHITE,
   THOMAS F. WALLACE.